(12) United States Patent
Hess

(10) Patent No.: US 6,250,789 B1
(45) Date of Patent: Jun. 26, 2001

(54) LAMP HOUSING ASSEMBLY AND METHOD FOR ASSEMBLING SAME

(75) Inventor: Marcus M. Hess, Seymour, IN (US)

(73) Assignee: Valeo Sylvania LLC, Seymour, IN (US)

( * ) Notice: Subject to any disclaimer, the term of this patent is extended or adjusted under 35 U.S.C. 154(b) by 0 days.

(21) Appl. No.: 09/405,768

(22) Filed: Sep. 27, 1999

(51) Int. Cl.$^7$ .................................................. B60Q 1/00
(52) U.S. Cl. .................. 362/546; 362/549; 439/230; 439/602
(58) Field of Search ...................... 362/546, 509, 362/549, 307, 310, 311, 520, 455, 276; 439/230, 602

(56) References Cited

U.S. PATENT DOCUMENTS 3,005,971 * 10/1961 Lennox ........................ 439/230
3,327,281 * 6/1967 Johnson ........................ 439/230
5,493,831    2/1996 Jansson .

* cited by examiner

Primary Examiner—Sandra O'Shea
Assistant Examiner—Bertrand Zeade
(74) Attorney, Agent, or Firm—William E. Meyer

(57) ABSTRACT

A lamp housing assembly is provided wherein clips secured to a lens engage the walls of a trough provided about the periphery of a lamp housing to hold the lens in place relative to the lamp housing until a volume of glue which has been provided within the trough to bond the lens to the trough is cured. Subsequent to curing, the clips remain in place buried within the glue thereby providing an aesthetically pleasing lamp housing assembly. A method for assembling such a lamp housing assembly is also provided.

19 Claims, 6 Drawing Sheets

LAMP HOUSING ASSEMBLY AND METHOD FOR ASSEMBLING SAME

TECHNICAL FIELD

The present invention relates to a lamp housing assembly which includes at least one clip which engages a lens in such a manner as to attach the clip to the lens. The clip also engages a lamp housing in such a manner as to hold the lens and the clip in place relative to the lamp housing during a gluing operation. Glue is provided to bond the lens to the lamp housing. The present invention particularly relates to such an automotive lamp housing assembly.

BACKGROUND ART

Lamp housing assemblies are well known in the art. One example is the conventional automotive lamp housing assembly. Such an assembly typically includes a lamp housing to which is attached a lens. The lamp housing assembly is structured and arranged to house a lamp therein having connectors attached thereto for electrical and mechanical connection to the wiring system of the vehicle. A reflector is also provided within the lamp housing assembly although in some embodiments the lamp housing may comprise a body which forms the reflector. In either situation the lens is typically glued to the lamp housing.

Automotive lamp housings and lenses are getting larger and generally have curved and other awkward forms. Therefore, special consideration must be given to the manner in which the lens is adhered to the lamp housing to form the lamp housing assembly. For example, it is very important that the lamp housing assembly be dimensionally stable. If the lens is not properly fitted to the lamp housing, or if the two pieces move while the glue sets, an incorrect mating will result and one or both of the parts may have to be scrapped. Since the gluing of the lens to the lamp housing is approximately the last step in the fabrication of the lamp assembly, and most of the manufacturing expense has therefore already been incurred, scrapping of the parts at this point tends to be very expensive. Although the improperly mated parts could be carefully taken apart, cleaned and reassembled, this procedure adds to the manufacturing cost. In addition, reassembly requires that the lens and lamp housing be held together again while the newly applied glue cures, there being no assurance that improper mating will not occur again to the same lamp housing assembly.

In order to assure that the lens is properly fitted to the lamp housing, it is known to provide the lamp housing with a glue track which contains glue and into which part of the lens is inserted for bonding the lens to the lamp housing. In order to insure that the lamp housing and lens do not move while the glue sets, the lens and lamp housing are structured to provide a configuration which permits metal clips which are external to the glue track to be clipped over the lens and the lamp housing to hold the two together during the bonding operation. When bonding is complete the clips are removed. However, some known lamp housing assemblies are structured so as not to permit the use of such external clips. For example, in dual shot lens designs which have a wrap around lip on the outboard side, there is no satisfactory manner in which to provide the required clips. In some instances when this occurs, it is possible to provide snaps which are either on slides or in a diepull. Such snaps serve to hold the lens and lamp housing together during the gluing operation. However, there are instances where this is not an option due to the fact that there is no way to slide a snap on the lens. This is a problem in the dual shot lens designs. One further option is to rely upon a conventional accumulator to retain the lens to the lamp housing. However, this is a costly and time consuming fabrication technique. In addition, in all instances where clips, snaps or holding frames are used to hold the lens and lamp housing together during the gluing operation, skilled labor is required to consistently assemble the lamp housing and lens correctly,and human error is still possible. In addition, such hardware is typically removed and recycled into the process once the glue has set. Such removal and recycling provides an additional fabrication step. Although it has been known to form the latches or clips directly in the plastic of the lens and the lamp housing, providing such structural configurations requires additional molding design. In addition, since such latches or clips are permanent features of the lamp housing and lens, when the gluing process has been completed, the latches and clips remain exposed and to this extent provide an unaesthetic design and may even interfere with how the lamp housing assembly fits with the rest of the vehicle.

DISCLOSURE OF THE INVENTION

It is an object of the present invention to provide an improved lamp housing assembly.

It is another object of the present invention to obviate the disadvantages of the prior art by providing an improved lamp housing assembly.

Another object of the present invention is to provide an improved lamp housing assembly wherein the clips used during the gluing process to hold the lens in place relative to the lamp housing are not removed from the lamp housing assembly and yet have no adverse aesthetic effect.

Yet another object of the present invention is to provide an improved method for assembling a lamp housing assembly which achieves all of the foregoing objects.

A further object of the present invention is to provide an improved automotive lamp housing assembly which achieves all of the foregoing objectives.

This invention achieves these and other objects by providing a lamp housing assembly, comprising a lens which comprises a lens portion. At least one clip is provided which comprises at least one first barb and at least one second barb. The second barb engages the lens portion and attaches the clip to the lens portion. A lamp housing is provided which comprises a trough. The lens portion and the clip are disposed within the trough. The first barb engages the trough to hold the lens and the clip in place relative to the lamp housing. Glue is disposed within the trough, the glue bonding the lens portion to the lamp housing.

BRIEF DESCRIPTION OF THE DRAWINGS

This invention may be clearly understood by reference to the attached drawings in which like reference numerals designate like parts and in which.

MODE FOR CARRYING OUT THE INVENTION

Figure 1:
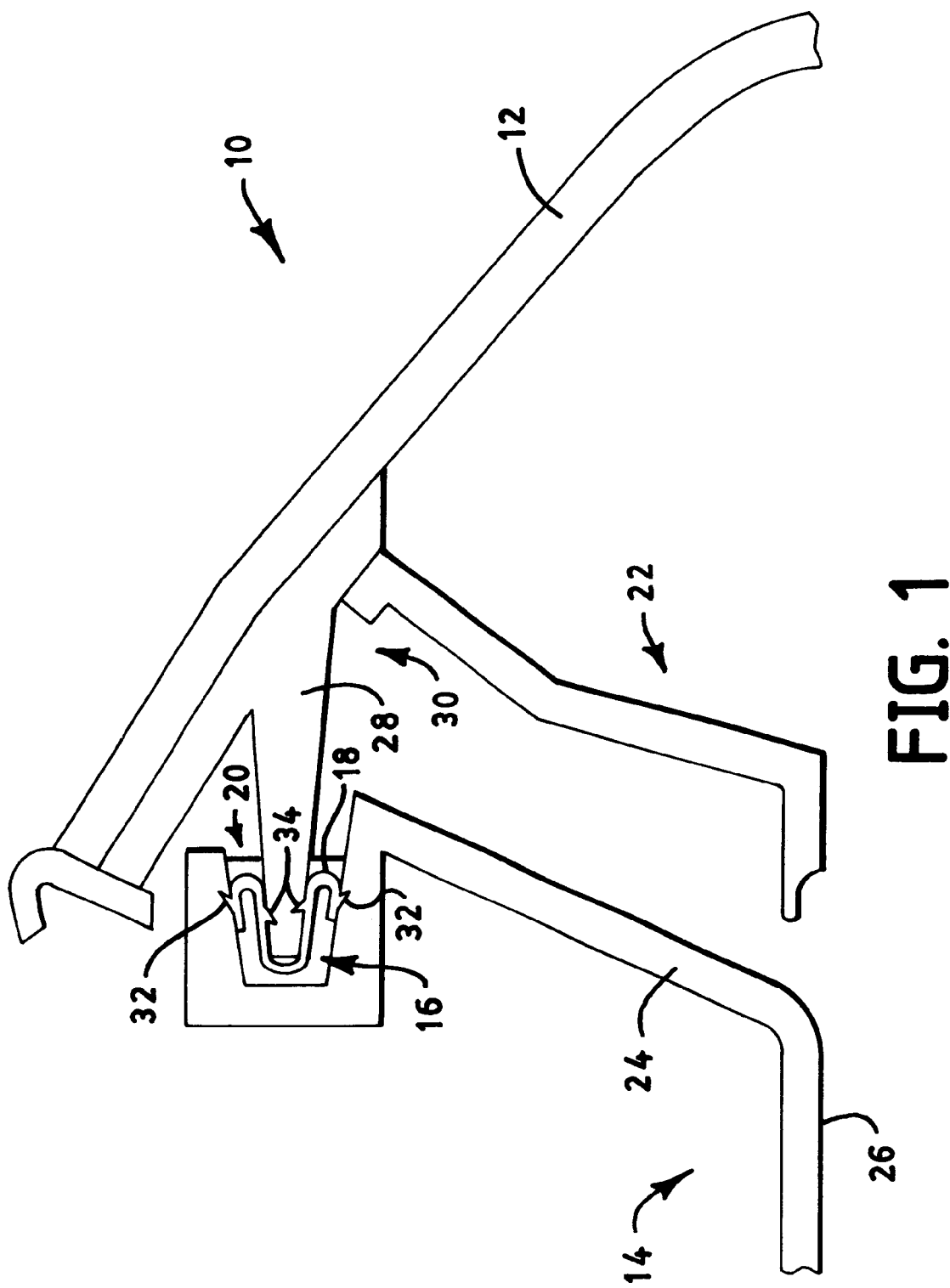
FIG. 1 is a sectional view of a portion of the lamp housing assembly of the present invention.

For a better understanding of the present invention, together with other and further objects, advantages and capabilities thereof, reference is made to the following disclosure and appended claims taken in conjunction with the above-described drawings.

The embodiment of this invention which is illustrated in the drawings is particularly suited for achieving the objects of this invention. FIGS. 1 to 8 illustrate examples of various embodiments of the present invention. In particular, each illustrate a lamp housing assembly which includes a lens having a lens portion, a lamp housing, at least one clip which serves to hold the lens in place relative to the lamp housing, and a volume of glue which bonds the lens to the housing. Each lamp housing illustrated in the drawings includes a trough into which the lens portion is positioned. Each clip illustrated in the drawings includes at least one first barb and at least one second barb. Each second barb engages the lens portion and serves to attach the clip thereto. The lens portion and clip(s) may then be disposed within the trough, each first barb thereby engaging the trough to hold the lens and the clip(s) in place relative to the lamp housing. Without limitation, usually there will be a plurality of spaced clips each having one or more first barb which engages the trough and one or more second barb which engages the lens portion. A volume of glue is disposed within the trough to bond the lens portion to the lamp housing.

FIG. 1 illustrates a lamp housing assembly 10 which includes a transparent plastic lens 12, a plastic lamp housing 14, a plurality of equally spaced metal spring clips 16 (only one is illustrated), and a volume of glue 18. Lamp housing 14 comprises a trough 20 which extends peripherally about the lamp housing at the front 22 thereof. Without limitation, the lamp housing 14 is an automotive lamp housing structured and arranged to provide for a lamp therein, having conventional connectors attached thereto, and a reflector. In the embodiment illustrated in FIG. 1, the lamp housing 14 comprises a body 24 which forms a reflector 26 and includes the trough 20.

The lens 12 illustrated in FIG. 1 includes a lens portion 28 which extends peripherally about the lens at the rear 30 thereof and is structured and arranged to mate with or otherwise be insertable into the trough 20. A plurality of clips 16 (only one is illustrated in FIG. 1) engage the lens portion 28 so as to attach the clips to the lens portion. To this end, equally spaced clips 16 are attached to the lens portion 28 by barbs. In particular, each clip 16 includes two first barbs 32 and two second barbs 34. The barbs 34 engage the lens portion 28 and serve to attach each clip 16 thereto. The volume of glue 18 is disposed within the trough. The lens portion 28 and clips 16 are disposed into the volume of glue within the trough 20. The barbs 32 engage the trough 20 to hold the lens 12 and clips 16 in place relative to the lamp housing 14. When the glue 18 is cured, it serves to bond the lens portion 28 to the lamp housing 14. In a preferred embodiment, the barbs 32 and 34 are pointed to facilitate penetration of the trough walls and the opposite surfaces of the lens portion 28, respectively, as described in more detail hereinafter. In the embodiment illustrated in FIG. 1, the clip 16 is disposed entirely within the trough 20, and the volume of glue encloses the clip within the trough. In this manner, the glue serves to protect the clip from erosion problems.

Figure 2:
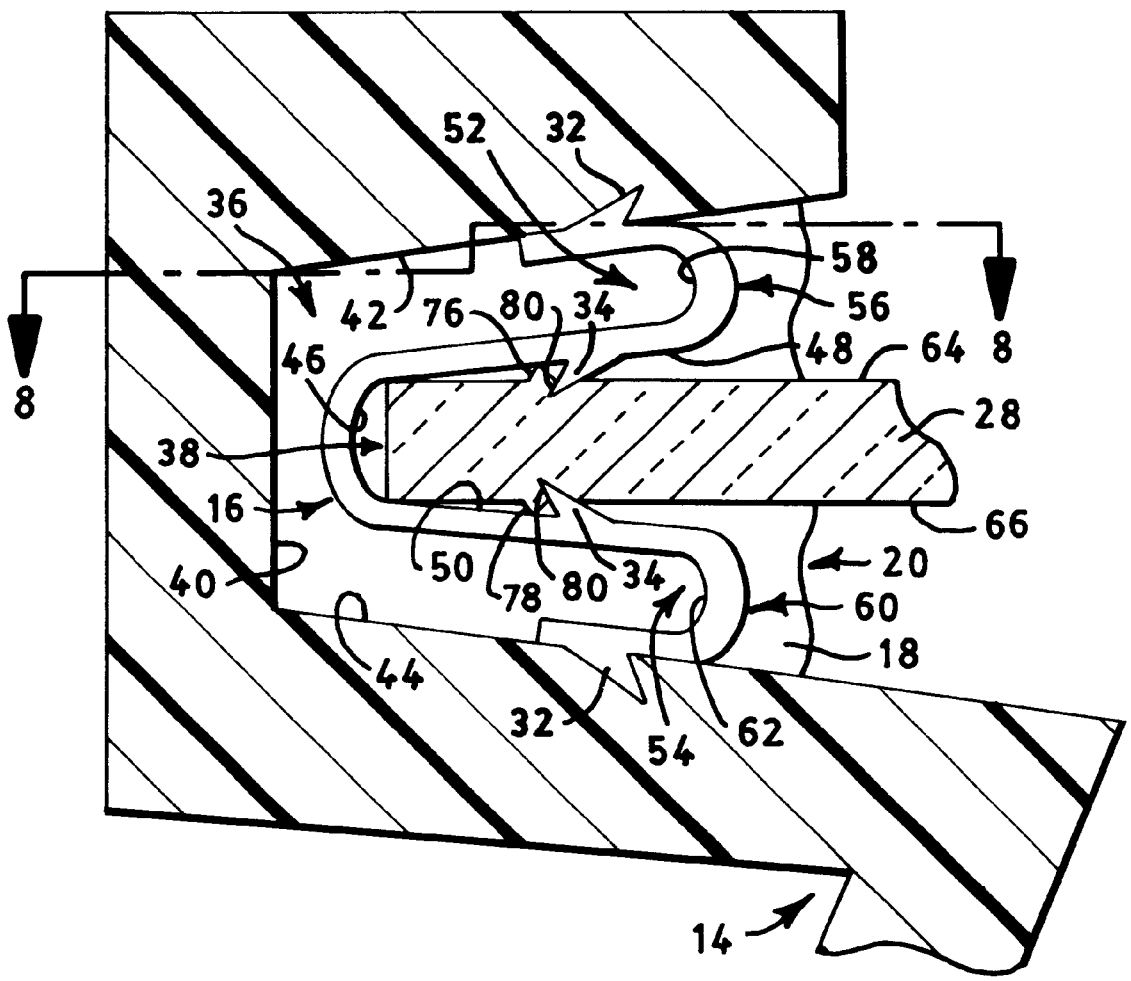
FIG. 2 is an enlarged view of a portion of FIG. 1.

Without limitation, the embodiments of the present invention depicted in the drawings each illustrate a clip having a U-shaped portion structured and arranged to form a U-shaped channel into which the lens portion is disposed. Each barb of the clip which engages the lens portion extends towards the U-shaped channel, and each barb which engages the trough extends away from the U-shaped channel. For example, as illustrated in FIG. 2, each clip 16 includes a U-shaped portion 36 which is structured and arranged to form a U-shaped channel 38 into which the lens portion 28 is disposed. Each barb 34 extends towards the channel 38 and engages the lens portion 28, and each barb 32 extends away from the channel 38 and engages the trough 20. Trough 20 comprises a base portion 40. A first trough wall 42 and an opposite second trough wall 44 extend away from the base portion 40. Similarly, clip 16 comprises a base segment 46. A clip wall 48 and an opposite clip wall 50 extend away from the base segment 46 towards respective segments 52 and 54. In the embodiment illustrated in FIGS. 1 and 2, the segment 52 comprises a U-shaped portion 56 which includes a base segment 58, and the segment 54 comprises a U-shaped portion 60 which includes a base segment 62. Base segment 46 faces away from base portion 40, and base segments 58 and 62 face towards the base portion 40. One barb 32 extends away from the U-shaped channel 38 at the U-shaped segment 56 of segment 52 of clip wall 48, and another barb 32 extends away from the U-shaped channel 38 at the U-shaped segment 60 of segment 54 of clip wall 50. Similarly, one barb 34 extends towards the U-shaped channel 38 from the clip wall 48, and another barb 34 extends towards the U-shaped channel 38 from the clip wall 50.

Clip 16 is a metal spring clip which is structured and arranged such that the lens portion 28 must be force fit into the U-shaped channel 38. Upon doing so, the resilience of the clip material causes the barbs 34 to engage the lens portion 28 by penetrating respective opposite surfaces 64 and 66 of the lens portion 28 to attach the clip 16 to the lens portion. Similarly, the spring clip 16 is structured and arranged such that the spring clip and lens portion 28 contained therein must be force fit into the U-shaped trough 20. Upon doing so, the resilience of the U-shaped portions 56 and 60 causes the barbs 32 to engage the trough walls by penetrating respective trough walls 42 and 44 to attach the clip 16 to the lamp housing 14. Clip 16 is symetrical in configuration, the effect of which is that the resilience of the clip imparts a symetrical force towards trough walls 42 and 44, and towards lens surfaces 64 and 66, as the barbs 32 and 34 penetrate the trough walls and the lens surface, respectively.

FIGS. 3 to 7 illustrate further alternative embodiments of the lamp housing assembly of the present invention. In each of FIGS. 3 to 7, a lamp housing assembly is provided which includes a lamp housing 14, lens 12, including lens portion 28, and glue 18 similar to that of FIGS. 1 and 2. The embodiments of FIGS. 3 to 7 each differ from that of FIGS. 1 and 2 to the extent that a different type of clip 16 is provided.

Figure 3:
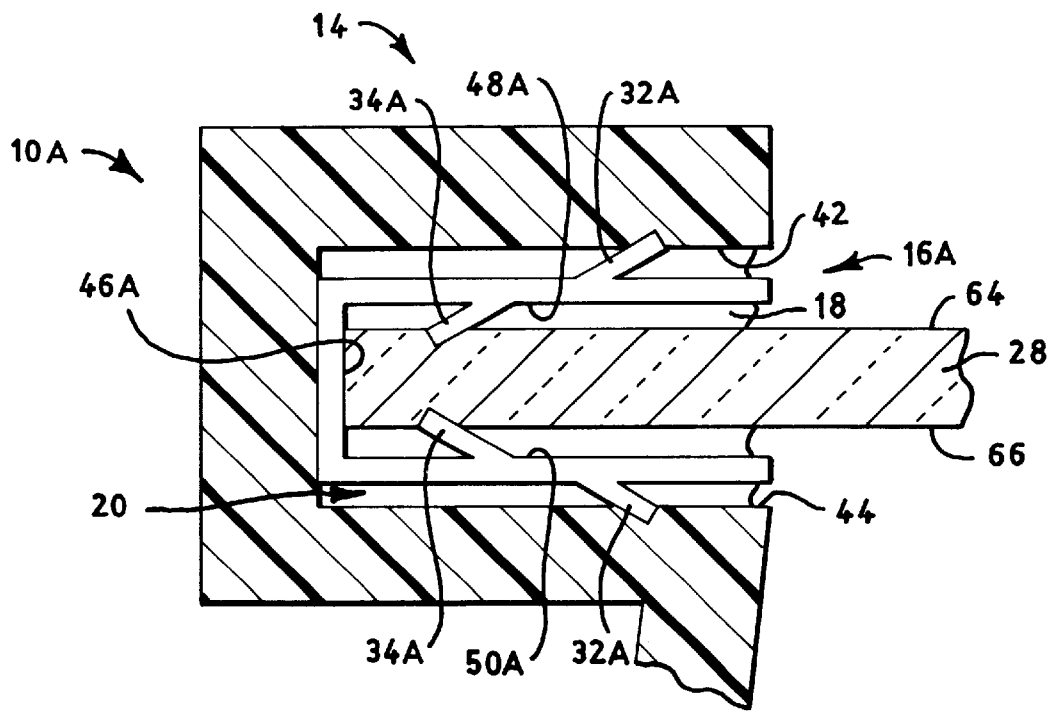
FIGS. 3 to 7 are diagrammatic representations of alternative embodiments of the lamp housing assembly of the present invention.

In the embodiment of FIG. 3, an automotive lamp assembly 10A is provided which includes a plurality of clips 16A (only one is illustrated). Clips 16A are identical to clips 16 except that clips 16A do not include the U-shaped portions 56 and 60. In the embodiment illustrated in FIG. 3, one barb 32A extends away from a segment of a clip wall 48A, and another barb 32A extends away from a segment of a clip wall 50A. When the spring clip 16A and lens portion 28 contained therein are force fitted into the U-shaped trough 20, the resilience of the clip walls 48A and 50A will cause the barbs 32A to engage the trough walls by penetrating trough walls 42 and 44 to attach the clip 16A to the lamp housing 14. Barbs 34A are identical to barbs 34 and penetrate respective opposite surfaces 64 and 66 of the lens portion 28 in the same manner in which barbs 34 penetrate surfaces 64 and 66.

Figure 4:
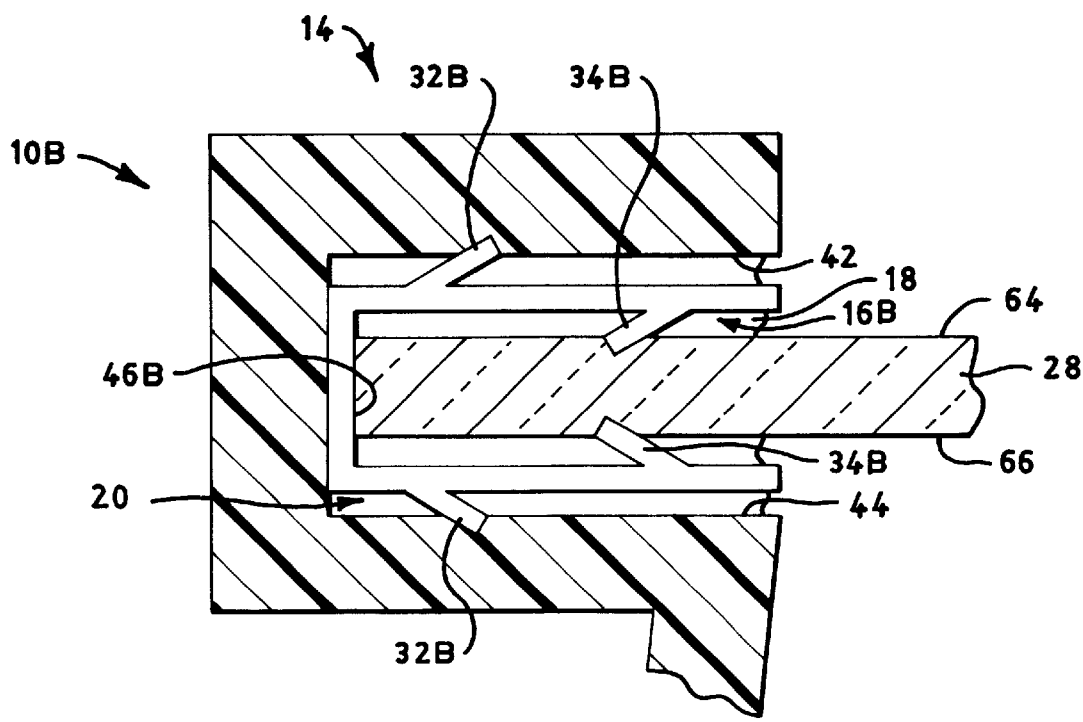

In the embodiment illustrated in FIG. 4, an automotive headlamp 10B is provided which includes a plurality of clips 16B (only one is illustrated). Clips 16B are identical to clips 16A with the exception that the location of the barbs extending from the clip walls is reversed. In particular, in the embodiment illustrated in FIG. 3, the barbs, 34A which engage the opposite surfaces 64 and 66 of the lens portion 28, are located between the base segment 46A of the clip 16A and the barbs 32A which engage respective trough walls 42 and 44. By contrast, in the embodiment illustrated in FIG. 4, the barbs 32B which engage respective trough walls 42 and 44 are located between the base segment 46B of the clip 16B and the barbs 34B which engage the opposite surfaces 64 and 66 of the lens portion 28.

Figure 5:
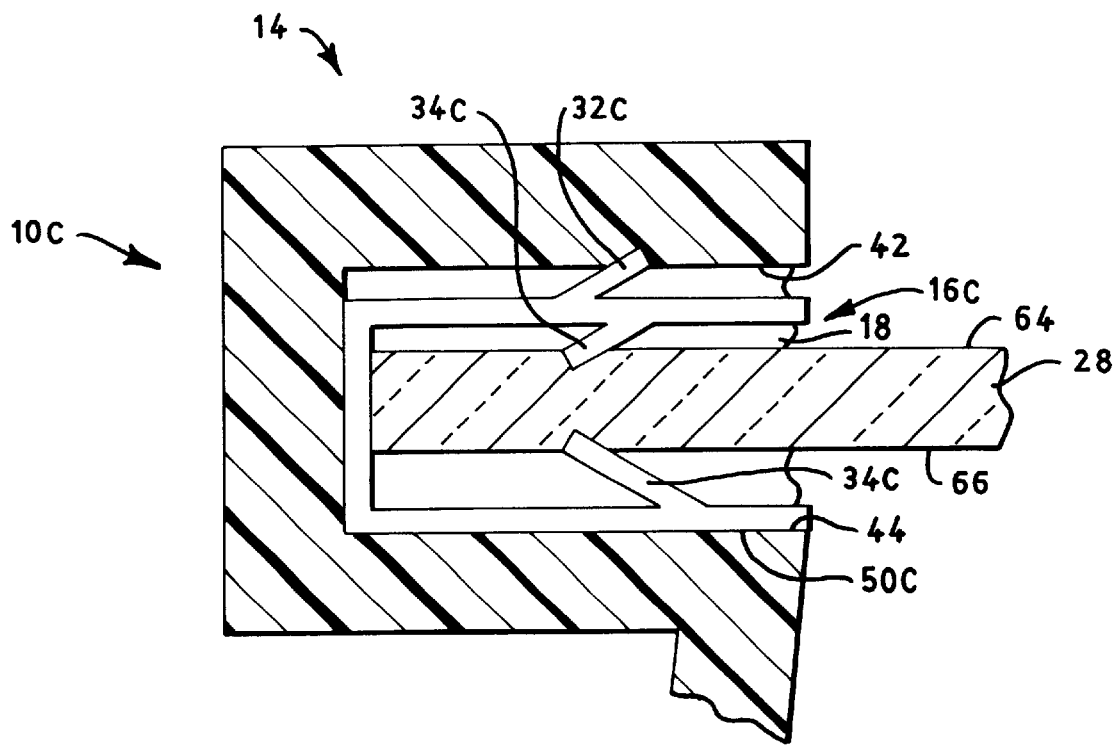

In the embodiment illustrated in FIG. 5, an automotive lamp assembly 10C is provided which includes a plurality of clips 16C (only one is illustrated). Each clip 16C comprises a barb 32C which engages the trough wall 42 and barbs 34C which engage opposite surfaces 64 and 66 of the lens portion 28. In the embodiment illustrated in FIG. 5, the resilience of the clip 16C causes the barb 32C to penetrate trough wall 42 and barbs 34C to penetrate the lens portion 28, and urges the clip wall 50C against the opposite trough wall 44.

Figure 6:
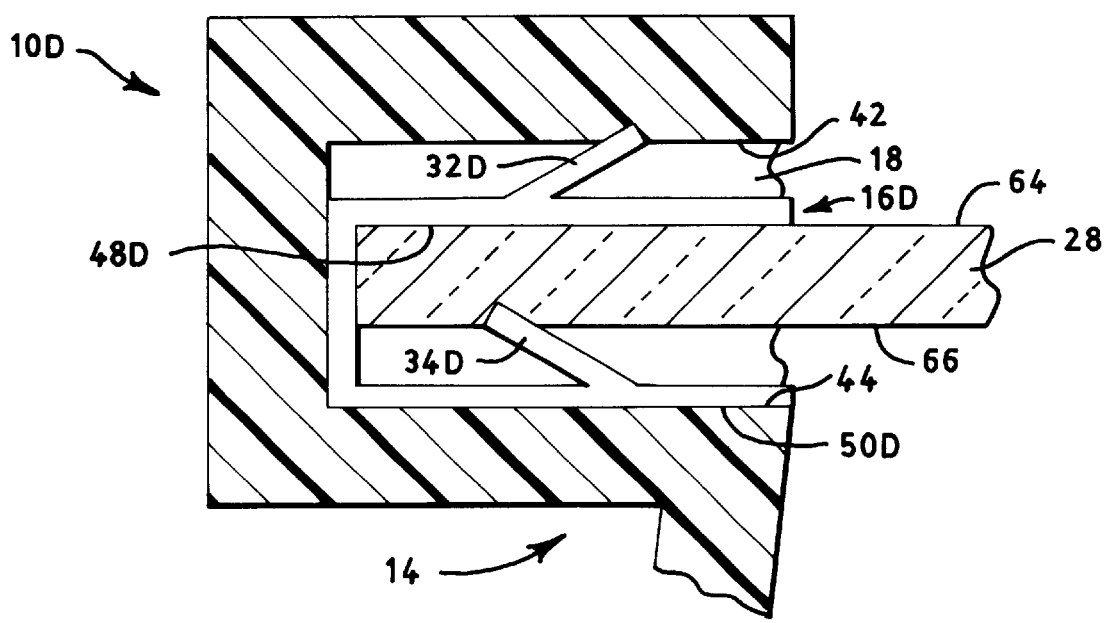

In the embodiment illustrated in FIG. 6, an automotive lamp assembly 10D is provided which includes a plurality of clips 16D (only one is illustrated). Each clip 16D comprises a barb 32D which engages the trough wall 42 and a barb 34D which engages surface 66 of the lens portion 28. In the embodiment illustrated in FIG. 6, the resilience of the clip 16D urges the clip wall 50D against the opposite trough wall 44 and the surface 64 of the lens portion 28 against the clip wall 48D of the clip 16D, and causes the barb 32D to penetrate trough wall 42 and the barb 34D to penetrate the lens portion 28.

Figure 7:
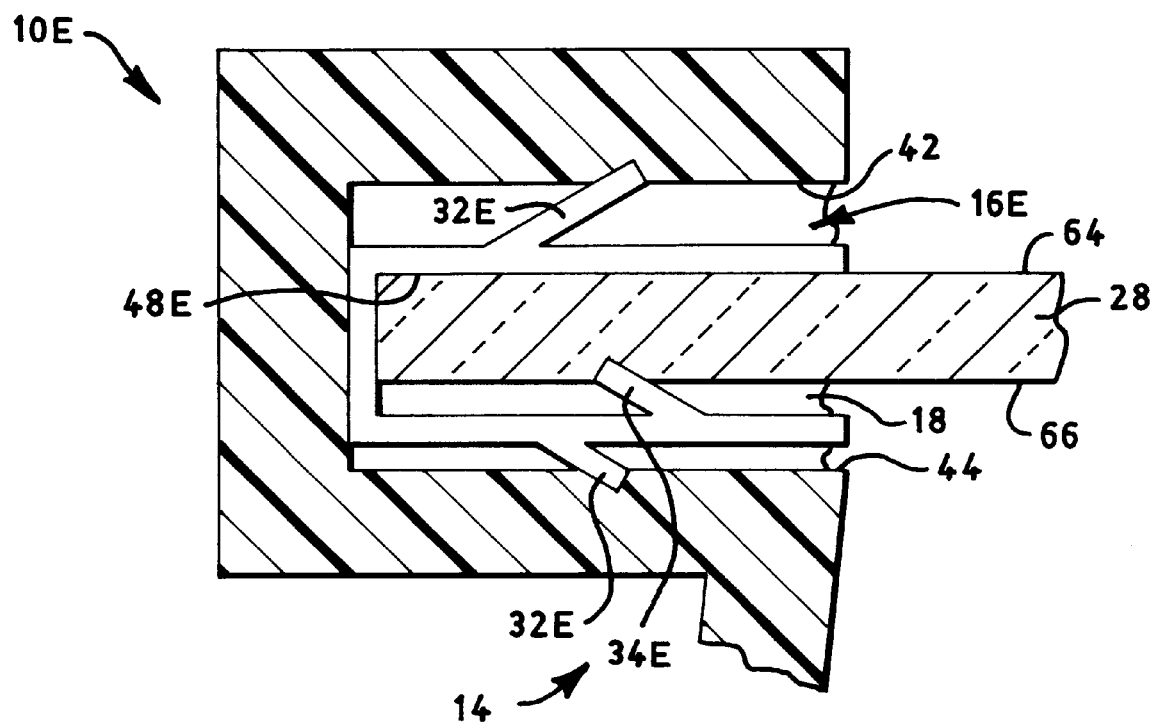

In the embodiment illustrated in FIG. 7, an automotive lamp assembly 10E is provided which includes a plurality of clips 16E (only one is illustrated). Each clip 16E comprises barbs 32E which engage respective trough walls 42 and 44 and a barb 34E which engages surface 66 of the lens portion 28. In the embodiment illustrated in FIG. 7, the resilience of clip 16E urges the surface 64 of the lens portion 28 against the clip wall 48E of the clip 16E, and causes the barbs 32E to penetrate trough walls 42 and 44, respectively, and the barb 34E to penetrate the lens portion.

Figure 8:
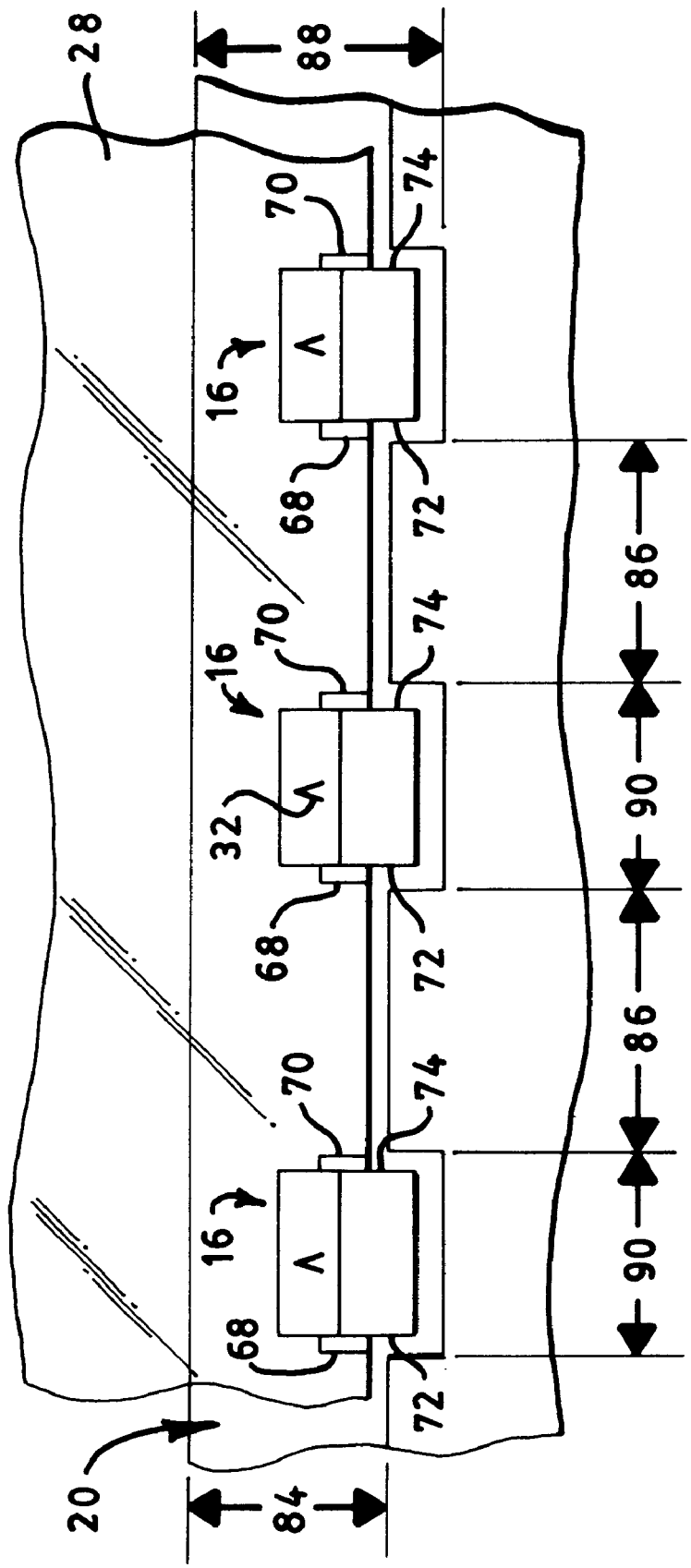
FIG. 8 is a view of FIG. 2 taken along lines 8—8 absent the glue illustrated in FIG. 2.

In considering the fabrication of the lamp housing assembly of the present invention, reference is made to the embodiment illustrated in FIGS. 1 and 2 by way of example. First, a lamp housing 14 having a trough 20, and a lens 12 having a lens portion 28, are provided. The lens 12 is a conventional polycarbonate plastic lens and the lamp housing 14 is a conventional polypropolene housing. The lens portion 28 is structured and arranged to fit within the trough 20 in a conventional manner. A plurality of clips 16 is also provided. In order to effect the desired piercing by the barbs 32 and 34, the clips may be configured as illustrated in FIGS. 1 and 2 using 0.380 inch thick spring steel. Clips 16 are attached to the peripherally extending lens portion 28. For example, equally spaced clips 16 may be attached to the lens portion 28 as illustrated in FIG. 8 with respect to three such clips. To this end, the distal end of the lens portion 28 is inserted into the U-shaped channel 38 of each clip 16 such that respective barbs 34 engage respective surfaces 64 and 66 of the lens portion to hold the clips in place relative thereto. The distal end segment of the lens portion 28 inserted into the U-shaped channel 38 is dimensioned such that such distal end portion must be force fit into such channel. In this manner, the resilience of the clips 16 will cause the barbs 34 to penetrate the polycarbonate plastic lens portion 28 to attach the clips 16 to the lens portion. The pointed tips of the barbs 34 facilitate such penetration. A volume of glue 18 may be positioned within the trough 20. A conventional two-part adhesive may be used which will not tend to expand or contract in the environment to which the lamp housing assembly will be subjected to during use. The entire lens portion 28 with clips 16 attached thereto is then inserted into the volume of glue 18 within the trough 20 such that the barbs 32 engage the trough. To this end, the lengths of the lens portion 28 which do not have a clip 16 attached thereto are inserted into the volume of glue 18 in trough 20 simultaneously as the lengths of the lens portion having the clips attached thereto are inserted into the volume of glue. During such insertion, the barbs 32 engage respective trough walls 42 and 44 of the trough 20 to hold the lens portion 28 and clips 16 in place relative to the lamp housing 14. The clips 16 are dimensioned such that they must be force fit into trough 20. In this manner, the resilience of the clip 16 causes the barbs 32 to penetrate the polypropolene lamp housing 14 at the trough walls 42 and 44 to attach the clips to the lamp housing. The pointed tips of the barbs 32 facilitate such penetration. The volume of glue 18 is then cured in a conventional manner thereby sealing and otherwise bonding the lens portion 28, and therefore the lens 28, to the lamp housing 14.

In fabricating the embodiment illustrated in FIGS. 1 and 2, the clips 16 are inserted in their entirety within the trough 20, and a sufficient volume of glue 18 has been provided within the trough so that during such insertion of the clips the glue encloses the clips within the trough.

If desired, the lens portion may comprise at least one alignment member which is structured and arranged to align a clip relative to the lens portion. For example, in the embodiment illustrated in FIG. 8, lens portion 28 of lens 12 includes opposing ribs 68,70 which are spaced to engage opposite edges 72,74 of the clips 16 to facilitate positioning the clips as they are being attached to the lens portion.

If desired, the lens portion may comprise one or more ribs which engage respective barbs to position the point of barb penetration into the lens portion at a predetermined location when attaching the clips to the lens portion. For example, in the embodiment illustrated in FIG. 2, the lens portion 28 comprises ribs 76 and 78 extending from surfaces 64 and 66, respectively. As the distal end of the lens portion 28 is inserted into the U-shaped channel 38 the barbs 34 engage respective ribs 76 and 78 and are cammed away from each other. When the lens portion 28 has been inserted into the U-shaped channel 38 sufficiently for the barbs 34 to disengage the ribs 76 and 78, the barbs will snap towards each other and penetrate the lens portion where the ribs 76 and 78 intersect the surfaces 64 and 66 at respective junctions 80 and 82. When the clips 16 are in place relative to the lens portion 28, the ribs 76 and 78 will be adjacent respective barbs 34 and will be positioned between a distal end of the lens portion and the barbs 34.

In order to insure that the clips are disposed entirely within the trough of the lamp housing, the trough may have a first depth at each length where only the lens portion is inserted, and a greater second depth at each length where a clip having the lens portion disposed therein is inserted. For example, with reference to FIG. 8, the trough 20 has a first depth 84 at each length 86 wherein only a length of lens portion 28 is inserted into the trough, and a depth 88 at each length 90 wherein a clip 16, having a lens portion disposed therein, is inserted into the trough. The depth 88 is greater than the depth 84 to accommodate the clip 16.

In considering the lamp housing assembly of the present invention, the clips do not have to be detached after the gluing process is completed. In addition, the clips are buried within the cured glue and do not appear on the exterior surface of the lens or lamp housing. The process is relatively simple and cost efficient, and the final assembly is more aesthetically pleasing.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A lamp housing assembly, comprising:
   a lens comprising a lens portion;
   at least one clip, said at least one clip comprising at least one first barb and at least one second barb, said at least one second barb engaging said lens portion and attaching said at least one clip to said lens portion;
   a lamp housing comprising a trough, said lens portion and said at least one clip being disposed within said trough, said at least one first barb engaging said trough to hold said lens and said at least one clip in place relative to said lamp housing; and
   a volume of glue disposed within said trough, said glue bonding said lens portion to said lamp housing.

2. The lamp housing assembly of claim 1 wherein said at least one clip comprises a first U-shaped portion structured and arranged to form a U-shaped channel into which said lens portion is disposed, and wherein said at least one second barb extends towards said U-shaped channel and penetrates said lens portion, and said at least one first barb extends away from said channel and penetrates said trough.

3. The lamp housing assembly of claim 2 wherein said lens portion comprises at least one alignment member, said at least one alignment member being structured and arranged to align said at least one clip relative to said lens portion.

4. The lamp housing assembly of claim 1 wherein said at least one clip is disposed entirely within said trough.

5. The lamp housing assembly of claim 4 wherein said volume of glue encloses said at least one clip within said trough.

6. The lamp housing assembly of claim 2 wherein said trough comprises a base portion, and a first trough wall and opposite second trough wall extending away from said base portion, and said first U-shaped portion comprises a first base segment, and a first clip wall and opposite second clip wall extending away from said first base segment to a first segment and a second segment, respectively, and further wherein said at least one first barb comprises at least one first barb extending from said first clip wall, and at least one first barb extending from said second clip wall, and penetrating said first trough wall and said second trough wall, respectively, and said at least one second barb comprises at least one second barb extending from said first clip wall, and at least one second barb extending from said second clip wall, and penetrating opposite surfaces of said lens portion.

7. The lamp housing assembly of claim 6, wherein said first segment comprises a second U-shaped portion comprising a second base segment, and said second segment comprises a third U-shaped portion comprising a third base segment, said first base segment facing away from said base portion and said second and third base segments facing towards said base portion, and further wherein each first barb extends from a respective first clip wall and second clip wall at a respective second U-shaped portion and third U-shaped portion.

8. The lamp housing assembly of claim 1, wherein said lamp housing comprises a body which forms a reflector, said body including said trough.

9. The lamp housing assembly of claim 1, wherein said lens portion comprises at least one rib adjacent at least one second barb where said second barb penetrates said lens portion, said rib being positioned between a distal end of said lens portion and said second barb.

10. The lamp housing of claim 2 wherein said trough has a first depth at each trough length where only a lens portion is disposed in said trough, and a second depth at each trough length where said clip having said lens portion disposed therein is disposed in said trough, said second depth being greater than said first depth.

11. An automotive lamp housing assembly, comprising:
    a lamp housing comprising a U-shaped trough, said trough comprising opposing trough walls extending from a base portion;
    at least one clip comprising a U-shaped portion forming a U-shaped channel comprising opposing clip walls extending from a first base segment, at least one of said opposing clip walls comprising at least one first barb extending away from said U-shaped channel, and at least one of said opposing clip walls comprising at least one second barb extending towards said U-shaped channel, said at least one clip mating within said trough and said at least one first barb engaging a trough wall;
    a lens comprising a lens portion extending into said trough, and into said U-shaped channel between said opposing clip walls, said lens portion having opposite lens surfaces, said at least one second barb engaging a lens surface of said opposite lens surfaces; and
    a volume of glue disposed within said trough, said glue bonding said lens portion to said lamp housing.

12. The automotive lamp housing assembly of claim 11 wherein said at least one clip is disposed entirely within said trough.

13. The automotive lamp housing assembly of claim 12 wherein said volume of glue encloses said at least one clip within said trough.

14. The automotive lamp housing assembly of claim 11 wherein said trough comprises a base portion, and a first trough wall and opposite second trough wall extending away from said base portion, and said first U-shaped portion comprises a first base segment, and a first clip wall and opposite second clip wall extending away from said first base segment to a first segment and a second segment, respectively, and further wherein said at least one first barb comprises at least one first barb extending from said first clip wall, and at least one first barb extending from said second clip wall, and engaging said first trough wall and said second trough wall, respectively, and said at least one second barb comprises at least one second barb extending from said first clip wall, and at least one second barb extending from said second clip wall, and engaging opposite surfaces of said lens portion.

15. The automotive lamp housing assembly of claim 14, wherein said first segment comprises a second U-shaped portion comprising a second base segment, and said second segment comprises a third U-shaped portion comprising a third base segment, said first base segment facing away from said base portion and said second and third base segments facing towards said base portion, and further wherein each first barb extends from a respective first clip wall and second clip wall at a respective second U-shaped portion and third U-shaped portion.

16. The automotive lamp housing assembly of claim 11 wherein said lamp housing comprises a body which forms a reflector, said body including said trough.

17. A method for assembling a lamp housing assembly comprising the steps of:

provingdig a lamp housing having a trough;

providing a lens having a lens portion structured and arranged to fit within said trough;

attaching at least one clip, having at least one first barb and at least one second barb, to said lens portion such that said at least one second barb engages said lens portion to hold said clip in place relative to said lens portion;

positioning a volume of glue within said trough;

inserting said lens portion and said at least one clip attached thereto into said volume of glue within said trough such that said at least one first barb engages said trough; and curing said glue causing said glue to bond said lens portion to said lamp housing.

18. The method of claim 17 wherein said inserting step comprises the step of inserting said at least one clip in its entirety within said trough.

19. The method of claim 18 wherein said positioning step includes positioning a sufficient volume of said glue within said trough so that during said inserting step said glue encloses said at least one clip within said trough.

\* \* \* \* \*